(12) United States Patent
Ballegeer et al.

(10) Patent No.: US 10,076,079 B2
(45) Date of Patent: Sep. 18, 2018

(54) AGRICULTURAL HARVESTER CLEAN GRAIN ELEVATOR

(71) Applicant: CNH Industrial America LLC, New Holland, PA (US)

(72) Inventors: Stefaan Ballegeer, Beernem (BE); Frank R. G. Duquesne, Zwevegem (BE); Eric E. Veikle, Lititz, PA (US); Pieter J. P. Willem, Gistel (BE)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/118,091

(22) PCT Filed: Feb. 12, 2015

(86) PCT No.: PCT/EP2015/052946
§ 371 (c)(1),
(2) Date: Aug. 10, 2016

(87) PCT Pub. No.: WO2015/121340
PCT Pub. Date: Aug. 20, 2015

(65) Prior Publication Data
US 2016/0345502 A1    Dec. 1, 2016

(30) Foreign Application Priority Data
Feb. 12, 2014   (BE) .................................. 2014/0091

(51) Int. Cl.
*A01D 17/02*   (2006.01)
*A01F 12/46*   (2006.01)
(Continued)

(52) U.S. Cl.
CPC .......... *A01F 12/46* (2013.01); *A01D 41/1208* (2013.01); *A01D 61/00* (2013.01); *A01F 12/60* (2013.01)

(58) Field of Classification Search
CPC ............ A01D 41/1208; A01D 41/1217; A01D 90/10; A01F 12/60; A01F 12/46; B65G 65/46; B60P 1/42
(Continued)

(56) References Cited

U.S. PATENT DOCUMENTS

| 958,965 | A | * | 5/1910 | May ....................... | B65G 37/00 |
| | | | | | 100/145 |
| 1,704,731 | A | * | 3/1929 | Eggert ................... | B65G 65/46 |
| | | | | | 198/550.1 |

(Continued)

*Primary Examiner* — Arpad Fabian-Kovacs
(74) *Attorney, Agent, or Firm* — Patrick M. Sheldrake; Peter K. Zacharias (57) ABSTRACT

An agricultural harvester is described, the harvester comprising a processor for receiving a flow of harvested crop and processing the harvested crop, an on-board tank for storing the processed crop, and a loading arrangement for transporting the flow of processed crop from the feeder to the on-board tank. The loading arrangement comprises an auger, the auger comprising a lower section with an inlet for receiving the flow of processed crop and an upper section with an outlet. The auger further comprises a tubular housing and an auger fighting mounted inside the tubular housing for, during use, transporting the flow of processed crop from the lower section to the upper section and outputting the processed crop via the outlet of the upper section. A clearance between the housing and the auger fighting is larger in the lower section of the auger compared to the upper section.

16 Claims, 5 Drawing Sheets

(51) Int. Cl.
*A01F 12/60* (2006.01)
*A01D 61/00* (2006.01)
*A01D 41/12* (2006.01)

(58) Field of Classification Search
USPC ........................................................ 460/114
See application file for complete search history.

(56) References Cited

U.S. PATENT DOCUMENTS

| | | | | |
|---|---|---|---|---|
| 1,767,248 A * | 6/1930 | Leach | ................... | F23K 3/14 |
| | | | | 110/286 |
| 3,152,702 A * | 10/1964 | Klemm | ............. | A01D 41/1208 |
| | | | | 198/602 |
| 3,265,226 A * | 8/1966 | Malcolm | ............ | A01D 41/1208 |
| | | | | 198/570 |
| 3,664,525 A * | 5/1972 | Herbsthofer | ....... | A01D 41/1217 |
| | | | | 414/326 |
| 3,938,683 A | 2/1976 | Bichel | | |
| 3,940,911 A * | 3/1976 | Schmitt | ................. | A01D 41/04 |
| | | | | 460/114 |
| 4,008,819 A | 2/1977 | Hanaway | | |
| 4,093,087 A * | 6/1978 | DeCoene | .......... | A01D 41/1217 |
| | | | | 198/668 |
| 5,052,874 A * | 10/1991 | Johanson | .............. | B65G 69/20 |
| | | | | 100/147 |
| 5,101,961 A * | 4/1992 | Bengtson | ............... | B65G 65/46 |
| | | | | 198/550.1 |
| 5,343,761 A | 9/1994 | Myers | | |
| 5,443,352 A * | 8/1995 | Schuhmacher | .... | A01D 41/1208 |
| | | | | 198/550.01 |
| 5,558,203 A * | 9/1996 | Herm | .................... | B65G 53/28 |
| | | | | 198/661 |
| 5,779,541 A * | 7/1998 | Helfrich | ............ | A01D 41/1271 |
| | | | | 177/119 |
| 5,863,247 A * | 1/1999 | Behnke | .................. | G01G 11/00 |
| | | | | 460/114 |
| 6,142,290 A * | 11/2000 | Tagliaferri | ............. | B65G 15/52 |
| | | | | 198/699 |
| 6,248,015 B1 | 6/2001 | Rayfield et al. | | |
| 6,471,032 B2 | 10/2002 | Busschaert et al. | | |
| 8,007,353 B1 * | 8/2011 | Werning | ................. | A01F 12/46 |
| | | | | 460/13 |
| 8,146,974 B2 * | 4/2012 | Horst | ................. | A01D 41/1226 |
| | | | | 296/15 |
| 2007/0191080 A1 * | 8/2007 | Voss | ................... | A01D 41/1217 |
| | | | | 460/114 |
| 2009/0290970 A1 * | 11/2009 | Farley | ................ | A01D 41/1217 |
| | | | | 414/808 |
| 2015/0014127 A1 * | 1/2015 | Johnson | ................. | B65G 33/08 |
| | | | | 198/676 |
| 2015/0237804 A1 * | 8/2015 | Van Mill | ................. | A01D 90/10 |
| | | | | 414/523 |

\* cited by examiner

AGRICULTURAL HARVESTER CLEAN GRAIN ELEVATOR

FIELD OF THE INVENTION

The invention relates to the field of agricultural harvesters, and more specifically to loading arrangements for loading a harvested or processed crop into an on-board tank of the harvester.

BACKGROUND OF THE INVENTION

In order to harvest crops such as grain or corn, agricultural harvesters such as combine harvesters are used. Such harvesters typically have a header for cutting the crop to be harvested and a threshing/cleaning module for processing the harvested crop prior to being stored in an on-board storage tank. Typically, the processed crop is transported to the storage tank using a loading arrangement including an elevator and a so-called bubble-up auger, i.e. an auger which is mounted in an upright position and is used to transport a flow of processed crop upwards. In such arrangement, the elevator may be arranged on an outside of the storage tank and is configured to transport the crop to be stored to an elevated position where the crop is picked up by a bubble-up auger which protrudes the storage tank, e.g. via a bottom of the storage tank. The bubble-up auger has an open upper end through which the crop to be stored thus 'bubbles up' and is gathered in the storage tank. A lower or bottom part of the bubble-up auger is arranged to receive the crop from the elevated position, e.g. via an aperture or inlet provided in the lower or bottom part, and transport the crop towards the open upper end.

Because of ever increasing demands with respect to the capacity and speed to harvest crops, it is equally important to ensure that the processed crop is transported as fast as possible to the storage tank of the harvester. The loading of the harvested crop into the storage tank should thus keep track with the harvesting of the crop. This has been found difficult using known loading arrangements.

SUMMARY OF THE INVENTION

It would be desirable to provide an agricultural harvester having an improved loading arrangement for loading a processed crop into an on-board storage tank. To better address this concern, the present invention provides in an agricultural harvester comprising:

a processor for receiving a flow of harvested crop and processing the harvested crop;

an on-board tank for storing the processed crop; and a loading arrangement for transporting the flow of processed crop from the feeder to the on-board tank; the loading arrangement comprising an auger, the auger comprising a lower section with an inlet for receiving the flow of processed crop and an upper section with an outlet, the auger comprising a tubular housing and an auger flighting mounted inside the tubular housing for, during use, transporting the flow of processed crop from the lower section to the upper section and outputting the processed crop via the outlet of the upper section, and wherein a clearance between the housing and the auger flighting is larger in the lower section of the auger compared to the upper section.

In accordance with the present invention, an agricultural harvester for harvesting crop such as corn or grain or the like is provided. The harvester comprises a processor for receiving a flow of harvested crop, which is then transported by a loading arrangement into an on-board tank. Such a processor can e.g. include a threshing or cleaning module for separating the crop into its various components, e.g. grain and material-other-than-grain (MOG). In accordance with the present invention, the loading arrangement comprises an auger, also referred to as a bubble-up auger. Such an auger is typically, at least party, mounted in an upright position and can be used to transport a flow of processed crop upwards. In an embodiment, an upper section of the auger, which is provided with an outlet, is arranged inside the on-board tank, e.g. via protrusion in a bottom or side wall of the on-board tank. During use, the harvested or processed crop is transported from the lower section to the upper open section and outputted via the outlet of the upper section. The outlet may e.g. be an open end of the upper section. In order to transport the harvested crop from the lower section to the upper section, the auger is provided with an auger flighting, mounted inside a tubular shaped housing.

In accordance with the present invention, a clearance between the housing and the auger flighting is selected larger in the lower section of the auger compared to the upper section. It has been devised by the inventors that the use of such an increased clearance (compared to the clearance in the upper section) enables an improved intake of processed crop into the auger.

In an embodiment, the increased or larger clearance in the lower section is obtained by providing a housing with a larger inner diameter for the lower section and maintaining an outer diameter of the auger flighting substantially constant in both the lower and upper section.

As an alternative, the inner diameter of the tubular housing may be kept constant in both the lower and upper section but the auger may be provided with an auger flighting having an outer diameter in the lower section which is smaller than the outer diameter in the upper section, thus providing in a larger clearance (between the auger flighting and the housing) in the lower section. Similar advantageous effects may be achieved with an auger flighting having a larger pitch in the lower section than in the upper section.

In an embodiment, a bottom part of the lower section is provided with a rounded or tapered shape. By doing so, the clearance between the housing and the auger flighting near the bottom of the auger can be made sufficiently small to avoid or mitigate the gathering of harvested crop on the bottom of the auger.

These and other aspects of the invention will be more readily appreciated as the same becomes better understood by reference to the following detailed description and considered in connection with the accompanying drawings in which like reference symbols designate like parts.

DETAILED DESCRIPTION OF EMBODIMENTS

Figure 1:
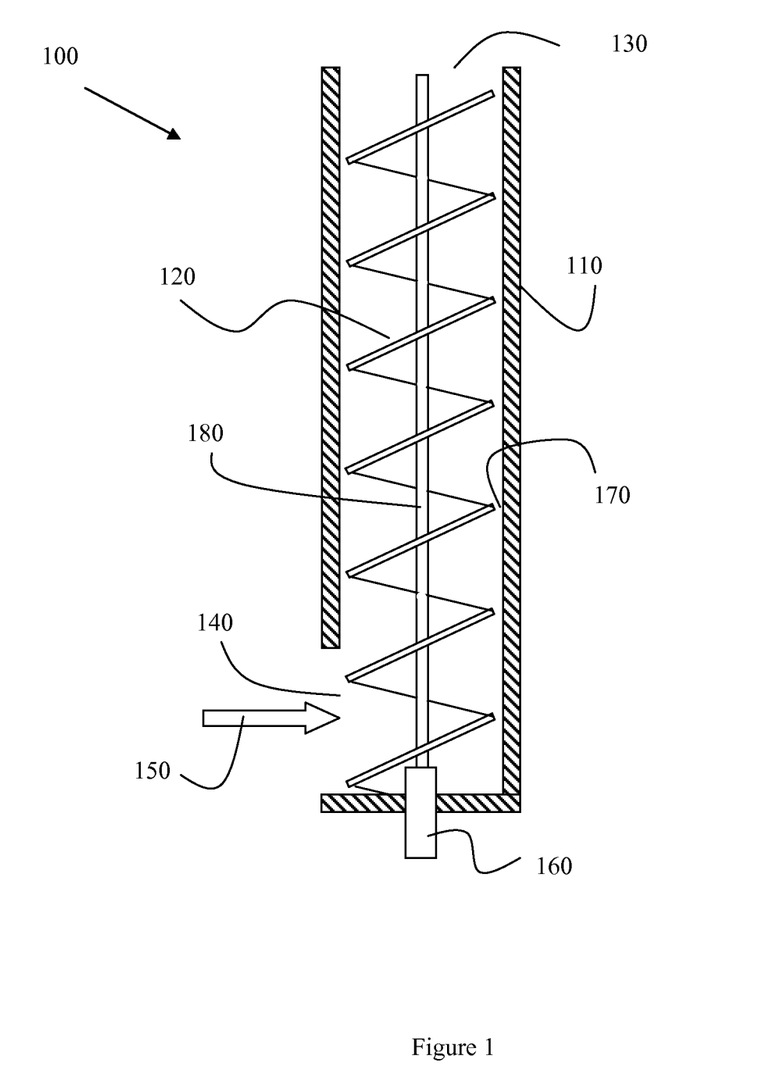
FIG. 1 depicts an auger as applied in an agricultural harvester known in the art.

FIG. 1 depicts a bubble-up auger 100 as may be applied in known agricultural harvesters such as combine harvesters as part of a loading arrangement which transports the harvested crop towards and into an on-board tank of the harvester. The bubble-up auger 100 comprises a housing 110 and an auger flighting 120 mounted inside the housing 110. The auger 100 further comprises an outlet 130 near the top of the auger and an inlet 140 near the bottom of the auger. During use, the auger 100 is arranged to receive a flow of harvested crop, indicated by the arrow 150, and transport the harvested crop upwards towards the outlet 130, e.g. by means of a driving mechanism 160, arranged to drive the auger flighting 120 about its central axis 180. Typically, the flow of harvested crop is provided to the inlet of the bubble-up auger 100 by means of an elevator (not shown).

It is important to note that the upper section of the auger 100 has an additional function beyond transporting the harvested crop towards exit 130. Since the receiving grain tank may extend above the outlet of the auger 100, the auger may have to push the grain upwards in the tank above the plane of the outlet 130. For that reason, it is preferred that the auger flighting 120 has a minimal clearance with regard to the housing 110 in order to obtain an optimal efficiency.

Typically, the inner diameter of the housing of an auger as applied in the present invention ranges from 300-400 mm, whereby a typical clearance of 5-15 mm is applied in the upper region. It is, however, to be noted that the optimal dimensions depend on many factors like, e.g., the harvesting capacity of the agricultural harvester and the type of crop to be harvested. All explicitly mentioned dimensions in this application are used for illustrating embodiments of the invention and are by no means intended to limit the protective scope of the claims.

Figure 2:
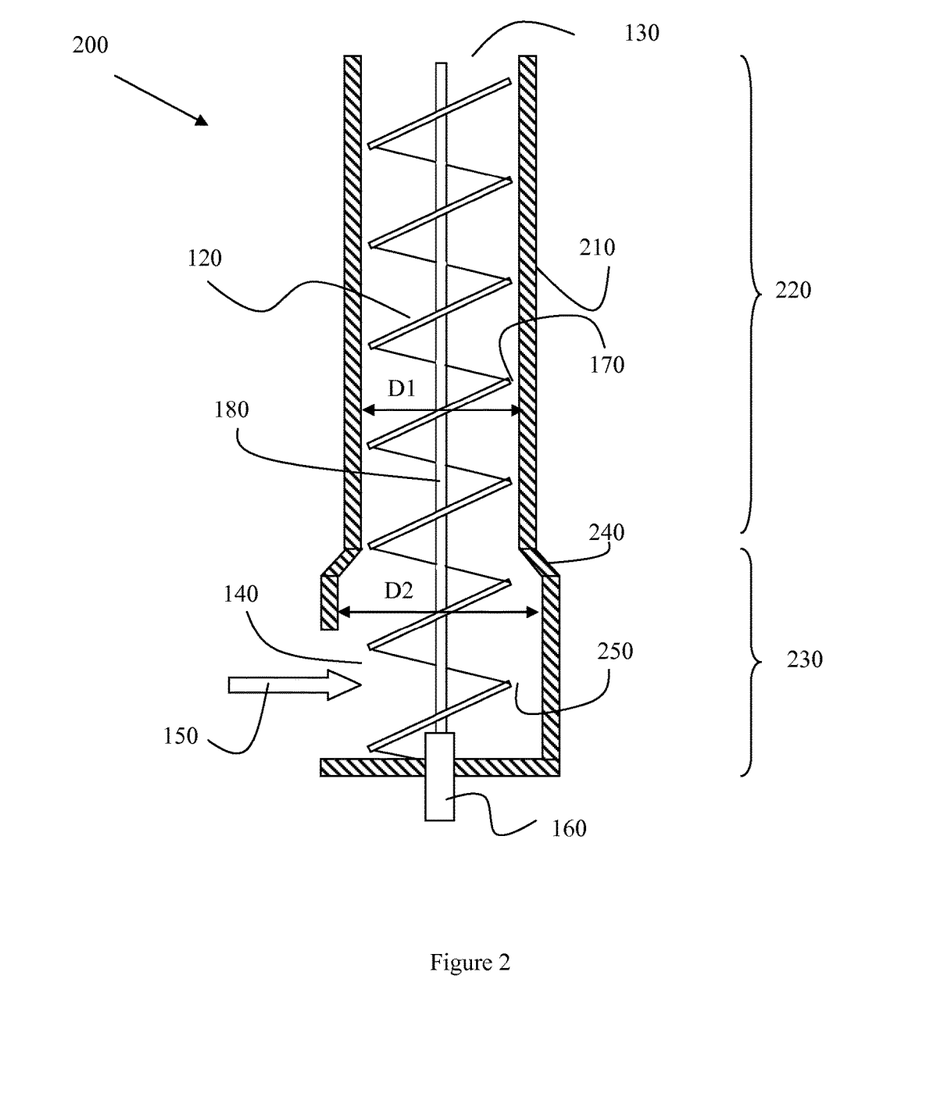
FIG. 2 depicts a first embodiment of an auger as can be applied in an agricultural harvester according to the present invention.

In FIG. 2, a first embodiment of an auger 200 as can be applied in an agricultural harvester according to the present invention is schematically shown.

Compared to the bubble-up auger of FIG. 1, the auger 200 as shown in FIG. 2 comprises a lower section 230 provided with the inlet 140 for receiving the flow 150 of harvested crop and an upper section 220 provided with an outlet 130, whereby the tubular housing 210 of the auger 200 has an increased diameter, in particular an increased inner diameter D2, in the lower section 230, compared to the inner diameter D1 of the housing 210 in the upper section 220. In the embodiment as shown, the auger flighting 120 as mounted inside the tubular housing 210 has a substantially constant outer diameter. As a result, the clearance between the housing and the auger flighting in the lower section (clearance 250) of the auger 200 is larger than the clearance between the housing and the auger flighting in the upper section (clearance 170).

Typically, the inner diameter of the housing of an auger as applied in the present invention ranges from 300-400 mm, whereby a typical clearance of 5-15 mm is applied in the upper region.

By increasing the clearance with e.g. 10-25 mm, an improved intake of the flow of harvested crop has been noticed. As a result, an improved throughput, i.e. transport capacity, can be achieved, while maintaining the required transport and push-up (or bubble-up) efficiency for the upper part of the auger.

Figure 3:
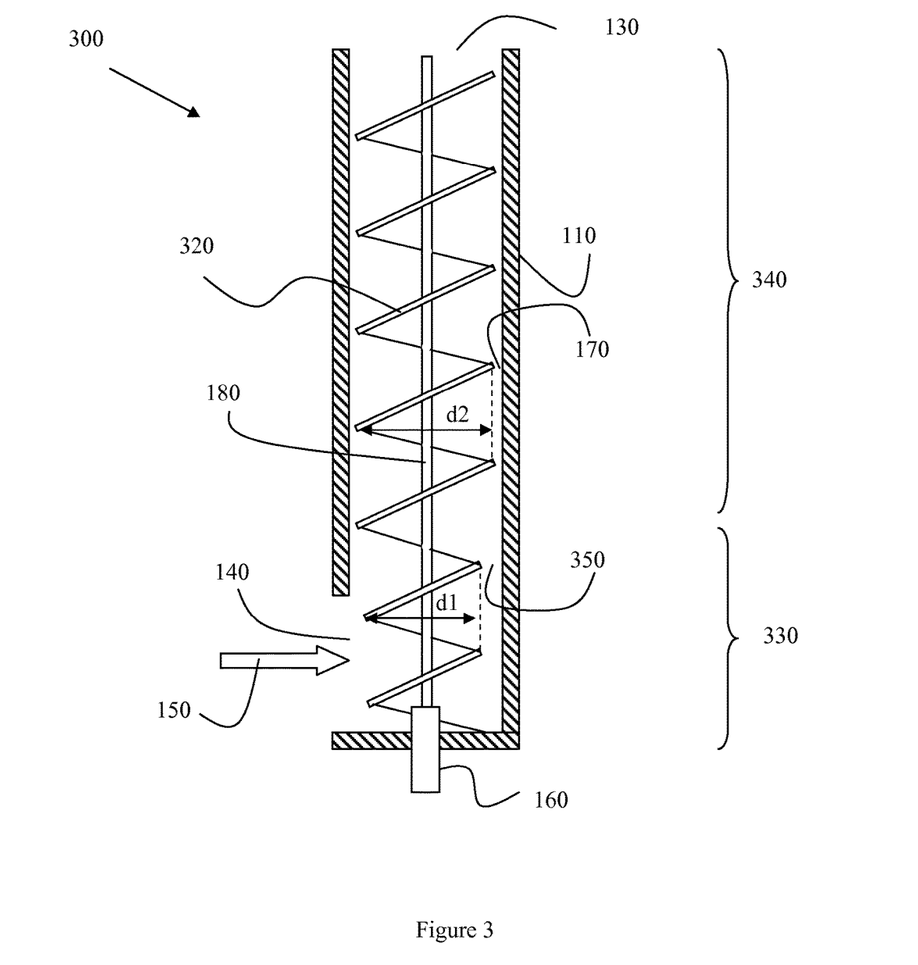
FIG. 3 depicts a second embodiment of an auger as can be applied in an agricultural harvester according to the present invention.

In FIG. 3, a second embodiment of an auger 300 as can be applied in an agricultural harvester according to the present invention is schematically shown. The auger 300 comprises a tubular housing 110 and an auger flighting 320 mounted inside the housing 110. Similar to the auger 200 of FIG. 2, the auger 300 as shown in FIG. 3 comprises an upper section 340 and a lower section 330, the lower section 330 comprising an inlet 140 for receiving a flow of harvested crop 150, the upper section 340 comprising an outlet 130. In the embodiment as shown, the auger flighting 320 has an outside diameter d1 in the lower section 330 which is smaller than the outside diameter d2 as applied in the upper section 340. In the embodiment as shown, the tubular housing 110 of the auger has a substantially constant inner diameter. As a result, the clearance between the housing and the auger flighting in the lower section (clearance 350) of the auger 200 is larger than the clearance between the housing and the auger flighting in the upper section (clearance 170).

By doing so, a similar effect is obtained, compared to the auger 200 as shown in FIG. 2; due to the increased clearance between the housing of the auger and the auger flighting, the intake of the flow 150 of harvested crop is facilitated.

In an embodiment, a combination of the features as shown in FIGS. 2 and 3 is applied. In such embodiment, the auger may thus be provided with both a housing having an increased inner diameter in the lower section and an auger flighting having a decreased outer diameter in the lower section.

It has been observed by the inventors that the application of a conventional bubble-up auger, such as auger 100 as shown in FIG. 1, may result in an obstruction of the flow of harvested crop in the intake area, i.e. the lower section of the auger where the inlet 140 is located. By increasing the clearance between the housing and the auger flighting in that region, the intake of the flow of harvested crop is improved; the flow of harvested crop experiences a reduced flow resistance. As a result, the capacity of the auger or bubble-up auger (i.e. the amount of processed crop outputted per unit of time) is improved.

As a consequence of the application of the increased clearance in the lower section of the auger (200, 300), there is a risk of harvested crop remaining on the bottom of the auger, in the area between the inner diameter of the housing and the outer diameter of the auger flighting. This risk may be reduced or mitigated by providing a auger as schematically shown in FIG. 4.

Figure 4:
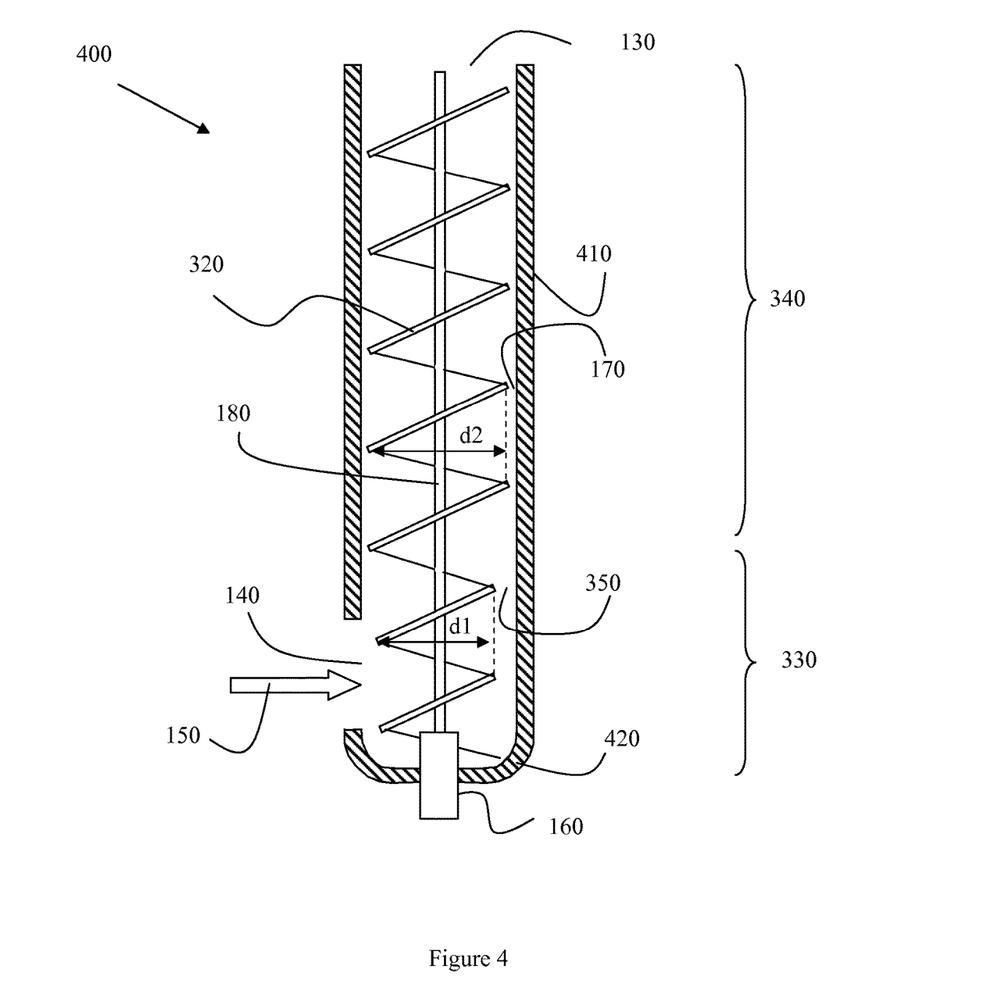
FIG. 4 depicts a third embodiment of an auger as can be applied in an agricultural harvester according to the present invention.

Compared to the embodiment of FIG. 3, the auger 400 as shown in FIG. 4 comprises a housing 410 having a rounded bottom portion 420, which result in a reduced clearance between the auger flighting 320 and the housing 410 near the bottom of the lower section 330. As a result, it can be avoided or at least mitigated that harvested crop remains on the bottom of the auger and is not transported upwards towards the outlet 130.

As an alternative, providing similar advantages, the bottom portion 420 may have a tapered shape.

The auger as schematically shown in FIGS. 2-4 may e.g. be applied in a loading arrangement as applied in an agricultural harvester according to the present invention.

Such harvester typically comprises a processor in which a harvested crop (e.g. corn or grain) is processed and provided to a loading arrangement configured to transport the harvested crop from the processor to an on-board tank of the harvester. Such loading arrangement may advantageously comprise an elevator for bringing the harvested crop to an elevated position where the harvested crop can be provided to the inlet of an auger as e.g. described in FIGS.

Figure 5:
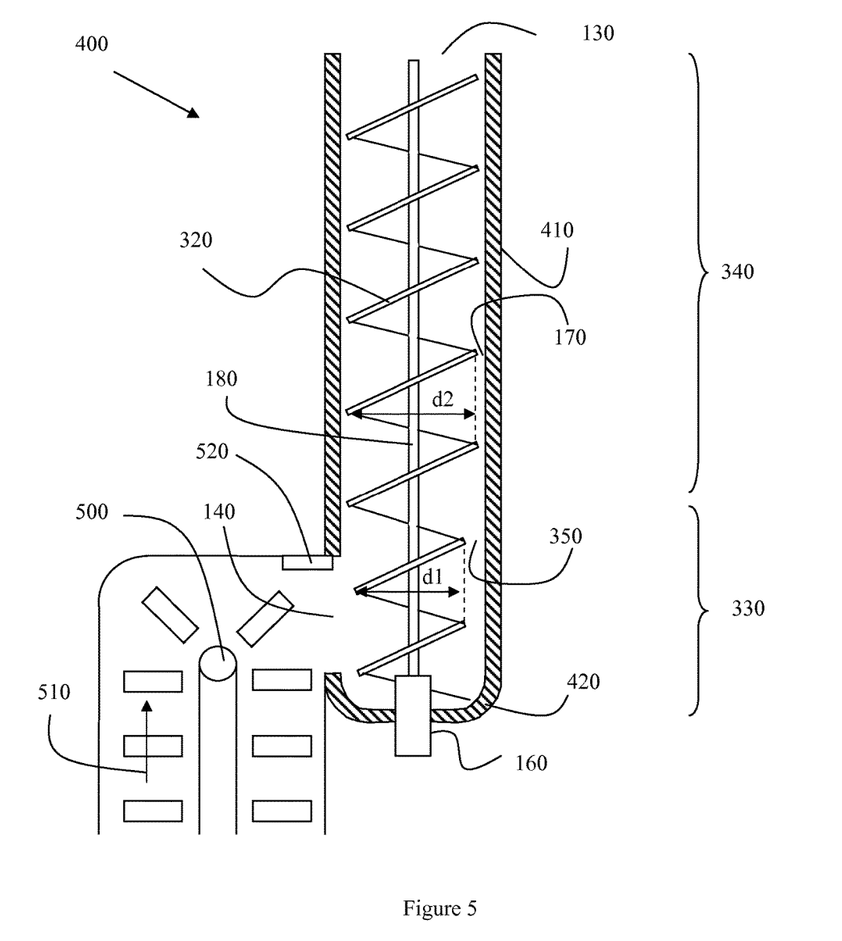
FIG. 5 depicts an embodiment of a loading arrangement as can be applied in an agricultural harvester according to the present invention.

2-4. FIG. 5 schematically shows such a loading arrangement comprising an auger 400 as shown in FIG. 4 and an elevator 500 arranged to transport a flow of harvested crop upwards (indicated by the arrow 510) towards the inlet 140 of the bubble-up auger 400. The loading arrangement further comprises a sensor 520 for providing a signal representative of the amount of harvested crop that is transported through the loading arrangement. The sensor may e.g. be a pressure sensor that is positioned such that it is impacted by the flow of harvested crop. The application of a bubble-up auger as described in FIGS. 2-4 may result in a more accurate determination of the amount of harvested crop that is transported, because the application of the increased clearance in the lower section of the bubble-up auger result in an improved intake of the harvested crop by the auger. As a result, a more continuous loading of the harvested crop is achieved. Without the use of the increased clearance in the lower section of the auger, the inlet section of the auger acts as a bottleneck where the flow of harvested crop occasionally could be blocked or limited. Such a blockage or a reduced flow could result in a varying, discontinuous flow through the loading arrangement. Such a (partial, temporarily) blockage may also affect the accuracy with which the amount of harvested crop is determined, using the sensor 520. A build-up of harvested crop in or near the inlet of the bubble-up auger may e.g. result in part of the flow of harvested crop being transported downwards by the elevator. In such a situation, the flow of harvested crop as determined by the sensor may be higher than the actual flow that is transported upwards via the bubble-up auger. The present invention may thus enable to determine more accurately the amount of harvested crop that is loaded into the on-board tank of the agricultural harvester.

In order to bring the harvested crop in the on-board tank, the auger may protrude a side wall or bottom of the on-board tank such that the upper section (e.g. section 230 or 340) is at least partly inside the on-board tank. In an embodiment, an upper part of the auger section that protrudes the on-board tank is rotatable so as to enable to change a position of the outlet of the upper portion from an upright position (during use) to a lowered position (during transport). In an embodiment, the upper part of the auger section may be rotated so as to substantially fit inside the on-board tank during transport, whereas, during use, i.e. when the auger is used to fill the on-board tank, the outlet of the auger extends above the on-board tank. In an embodiment, in order to facilitate the unloading of the processed crop into the on-board tank, a top part of the upper section, may have an increased inner diameter compared to the remaining part of the upper section. The upper section may thus have an increased inner diameter at or near the outlet.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. In this respect, it should be noted that the cited dimensions are only indicative for good understanding and are not restricted to the scope of the invention.

Further, the terms and phrases used herein are not intended to be limiting, but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language, not excluding other elements or steps). Any reference signs in the claims should not be construed as limiting the scope of the claims or the invention.

The mere fact that certain measures are recited in mutually different dependent claims does not indicate that a combination of these measures cannot be used to advantage.

The invention claimed is:

1. An agricultural harvester comprising:
a processor for receiving harvested crop and processing the harvested crop; an on-board tank for storing the processed crop; and
a loading arrangement extending in a vertical direction for transporting the processed crop to the on-board tank, the loading arrangement comprising an auger assembly comprising a tubular housing and auger flighting mounted inside the tubular housing, the tubular housing and auger flighting both having a lower section and an upper section;
wherein the lower section of the housing comprises an inlet configured for receiving the processed crop and an upper section of the housing comprising an outlet, the auger assembly configured for transporting the processed crop upward from the lower section to the upper section and outputting the processed crop via the outlet,
wherein a clearance between a circumference of an inner diameter of the housing and the auger flighting is larger in the lower section of the auger than in the upper section of the auger,
wherein the clearance is larger than in the lower section both between the auger flighting and a first side of the housing adjacent the inlet and a second side of the housing opposing the inlet than between the auger flighting and the first side and the second side of the housing in the upper section,
wherein an inner diameter of the lower section of the tubular housing is larger than an inner diameter of the upper section of the tubular housing.

2. The agricultural harvester according to claim 1, wherein an outer diameter of the auger flighting is substantially constant in both the lower section and the upper section of the auger.

3. The agricultural harvester according to claim 1, wherein a bottom portion of the lower section of the auger has a rounded or tapered shape.

4. The agricultural harvester according to claim 1, wherein an inner diameter of the upper section of the auger is in a range of 300-400 mm.

5. The agricultural harvester according to claim 1, wherein the clearance between the housing and the auger flighting is in a range of 5-15 mm in the upper section of the auger.

6. The agricultural harvester according to claim 1, wherein the clearance between the housing and the auger flighting is at least 5 mm larger in the lower section of the auger than in the upper section of the auger.

7. The agricultural harvester according to claim 1, wherein the clearance between the housing and the auger flighting is 10-25 mm larger in the lower section of the auger than in the upper section of the auger.

8. The agricultural harvester according to claim 1, wherein the loading arrangement further comprises an elevator configured to receive the processed crop and provide the processed crop to the inlet of the auger.

9. The agricultural harvester according to claim 8, wherein the elevator comprises a sensor configured to provide a signal representative of a flow of the processed crop.

10. The agricultural harvester according to claim 9, wherein the sensor is a pressure sensor and is configured to sense an impact of the flow of the processed crop.

11. The agricultural harvester according to claim 1, wherein the upper section of the auger protrudes a side wall or bottom of the on-board tank.

12. The agricultural harvester according to claim 11, wherein at least part of the upper section of the auger that protrudes from the on-board tank is rotatable.

13. The agricultural harvester according to claim 1, wherein at least part of the auger is mounted in a upright position.

14. An auger for an agricultural harvester, the auger comprising: a vertically extending auger flighting and tubular housing comprising:
   a lower section comprising an inlet for receiving harvested crop; and
   an upper section above the lower section, the upper section comprising an outlet for outputting the harvested crop; and
   the auger flighting mounted inside the tubular housing for transporting the harvested crop from the lower section to the upper section and outputting the harvested crop via the outlet of the upper section,
   wherein a clearance between an inner diameter of the housing and the auger flighting is larger in the lower section than in the upper section, wherein the clearance is larger than in the lower section both between the auger flighting and a first side of the housing adjacent the inlet and a second side of the housing opposing the inlet than between the auger and a first side and the auger and a second side in the upper section,
   wherein an inner diameter of the lower section is larger than an inner diameter of the upper section.

15. The auger of claim 14, wherein an outer diameter of the auger flighting is substantially constant in both the lower section and the upper section.

16. The auger of claim 14, wherein a bottom portion of the lower section has a rounded or tapered shape.

* * * * *